US011321675B2

(12) United States Patent
Allen et al.

(10) Patent No.: US 11,321,675 B2
(45) Date of Patent: May 3, 2022

(54) COGNITIVE SCRIBE AND MEETING MODERATOR ASSISTANT

(71) Applicant: International Business Machines Corporation, Armonk, NY (US)

(72) Inventors: Ira Allen, Dallas, TX (US); Blaine H. Dolph, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 16/191,607

(22) Filed: Nov. 15, 2018

(65) Prior Publication Data

US 2020/0160278 A1    May 21, 2020

(51) Int. Cl.
*G06Q 10/10* (2012.01)
*G10L 15/22* (2006.01)
(Continued)

(52) U.S. Cl.
CPC ..... *G06Q 10/1095* (2013.01); *G06F 16/3329* (2019.01); *G06F 16/35* (2019.01);
(Continued)

(58) Field of Classification Search
CPC .......... G06Q 10/1095; G06Q 10/06393; G10L 15/22; G10L 2015/228; G06F 16/3329; G06F 16/35; G06K 9/00315; H04L 67/10; H04M 15/44; H04M 15/58; H04M 1/56; H04M 1/72566; H04M 2215/0188; H04M 2215/2026; H04M 2250/10; H04M 2250/60
See application file for complete search history.

(56) References Cited

U.S. PATENT DOCUMENTS 5,642,520 A * 6/1997 Takeshita .............. G06F 40/253
704/3
8,626,509 B2    1/2014 Roy et al.
(Continued)

FOREIGN PATENT DOCUMENTS

WO    2015/085402 A1    6/2015

OTHER PUBLICATIONS

Tur et al., The CALO Meeting Assistant System, Aug. 6, 2010, IEEE Transactions on Audio, Speech, and Language Processing, vol. 18, No. 6, pp. 1601-1611 (Year: 2010).*

*Primary Examiner* — Robert D Rines
(74) *Attorney, Agent, or Firm* — Scott S. Dobson; Hunter E. Webb; Keohane & D'Alessandro PLLC

(57) ABSTRACT

Disclosed embodiments provide a computer-implemented technique for monitoring deviation from a meeting agenda. A meeting moderator and meeting agenda are obtained. Meeting dialog, along with facial expressions and/or body language of attendees is monitored. Natural language processing, using entity detection, disambiguation, and other language processing techniques, determines a level of deviation in the meeting dialog from the meeting agenda. Computer-implemented image analysis techniques ascertain participant engagement from facial expressions and/or gestures of participants. A deviation alert is presented to the moderator and/or meeting participants when a deviation is detected, allowing the moderator to steer the meeting conversation back to the planned agenda.

17 Claims, 18 Drawing Sheets

(51) Int. Cl.
*G06F 16/332* (2019.01)
*G06F 16/35* (2019.01)
*G06V 40/16* (2022.01)

(52) U.S. Cl.
CPC ............ G06V 40/176 (2022.01); G10L 15/22 (2013.01); *G10L 2015/228* (2013.01)

(56) References Cited

U.S. PATENT DOCUMENTS

| | | |
|---|---|---|
| 8,914,452 B2 | 12/2014 | Boston et al. |
| 2003/0191627 A1* | 10/2003 | Au ........................ G06F 40/30 704/9 |
| 2006/0224584 A1* | 10/2006 | Price ..................... G06F 16/313 |
| 2006/0259473 A1* | 11/2006 | Li ......................... G06Q 30/02 |
| 2013/0144616 A1* | 6/2013 | Bangalore ............. G10L 15/197 704/226 |
| 2014/0229471 A1 | 8/2014 | Galvin, Jr. et al. |
| 2014/0324982 A1* | 10/2014 | Agrawal ............. H04L 12/1831 709/206 |
| 2015/0278585 A1 | 10/2015 | Laksono et al. |
| 2016/0124940 A1 | 5/2016 | Cecchi et al. |
| 2016/0162844 A1 | 6/2016 | Rachuri et al. |
| 2016/0188672 A1* | 6/2016 | Lev ........................ G06Q 50/01 707/728 |
| 2017/0150099 A1 | 5/2017 | Duckworth et al. |
| 2017/0264447 A1* | 9/2017 | Wallbaum ........... H04L 12/1831 |
| 2017/0270951 A1 | 9/2017 | Ekambaram et al. |
| 2019/0051301 A1* | 2/2019 | Locascio ............... H04L 51/066 |
| 2020/0013403 A1* | 1/2020 | Sugiyama ............... G10L 13/00 |

* cited by examiner

However, when the threshold criteria are met, in some situations, the processor may determine whether the data storage medium unit has a threshold amount of free storage space available to perform diagnostic testing which may include for example intrusive error checking. Computer storage space may include for example sufficient disk sectors being available on a disk. When there is insufficient computer storage space, then the processor may continue operating the data storage medium unit a until, for example, enough computer storage space becomes available.

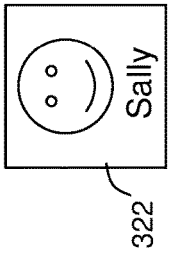
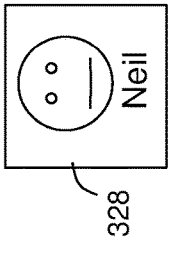
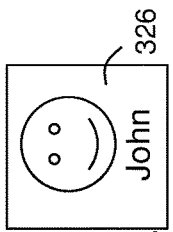
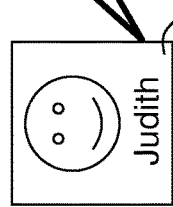
FIG. 18

COGNITIVE SCRIBE AND MEETING MODERATOR ASSISTANT

FIELD

Embodiments relate to organizational meeting deviation detection and, more particularly, to computer-implemented techniques for monitoring deviation from a meeting agenda.

BACKGROUND

Business meetings can veer off course as the participants touch on peripheral topics and deep dive into other areas. This creates inefficiencies and wastes time. Furthermore, the objectives of the meeting are not completely achieved. An additional problem is that at the conclusion of the meeting, most summaries or "meeting minutes" do not fully capture the key items identified/discussed that are needed to document thorough understandings reached, as well as a listing of unresolved issues or points for further discussion at a future meeting, as well as follow-up actions and who owns those actions. The meeting moderator that facilitates the discussion is faced with the challenges of running out of time and/or managing time.

SUMMARY

In one embodiment, there is provided a computer-implemented method for monitoring a meeting with two or more participants, wherein one participant of the two or more participants is a meeting moderator, the method comprising: identifying one or more agenda items for the meeting; monitoring participant dialog during the meeting; identifying a dialog topic based on the participant dialog; computing a deviation between the dialog topic and the one or more agenda items; and providing a notification of the deviation to the meeting moderator.

In another embodiment, there is provided an electronic computation device comprising: a processor; a memory coupled to the processor, the memory containing instructions, that when executed by the processor, perform the steps of: identifying one or more agenda items for a meeting; monitoring participant dialog during the meeting; identifying a dialog topic based on the participant dialog; computing a deviation between the dialog topic and one or more meeting agenda items; and providing a notification of the deviation to a meeting moderator.

In yet another embodiment, there is provided a computer program product for an electronic computation device comprising a computer readable storage medium having program instructions embodied therewith, the program instructions executable by a processor to cause the electronic computation device to perform the steps of: identifying one or more agenda items for a meeting; monitoring participant dialog during the meeting; identifying a dialog topic based on the participant dialog; computing a deviation between the dialog topic and one or more meeting agenda items; and providing a notification of the deviation to a meeting moderator.

BRIEF DESCRIPTION OF THE DRAWINGS

Features of the disclosed embodiments will be more readily understood from the following detailed description of the various aspects of the invention taken in conjunction with the accompanying drawings.

FIG. 8 shows additional example meeting dialog.

FIG. 17 shows an example of a bigram analysis in accordance with embodiments of the present invention.

FIG. 18 shows an additional example meeting dialog discussing an action item.

Figure 1:
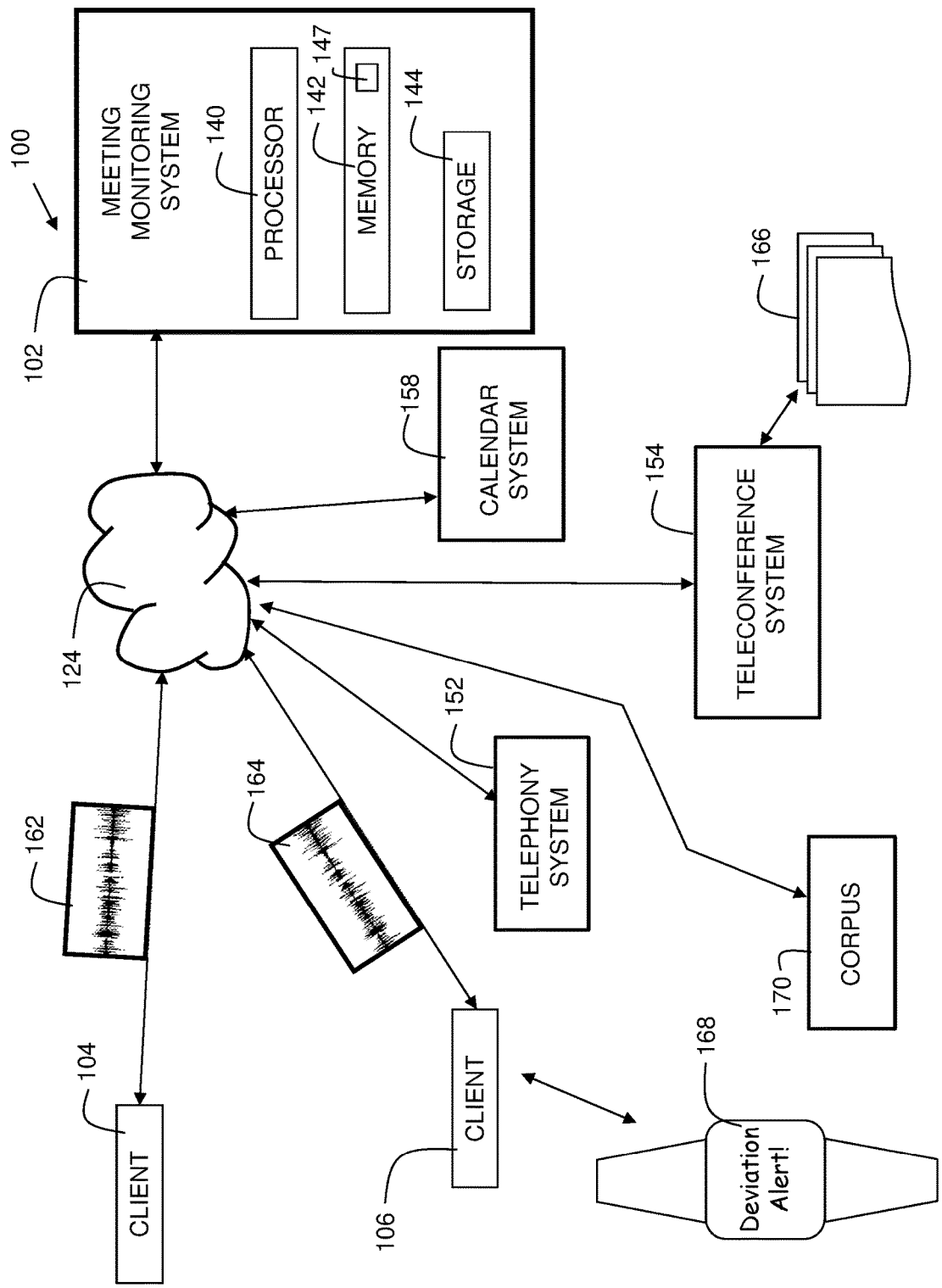
FIG. 1 shows an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide a computer-implemented technique for monitoring deviation from a meeting agenda, and providing mechanism and techniques to assist a moderator in keeping a meeting on track with its intended purpose/agenda. A meeting moderator and meeting agenda are obtained. Meeting dialog, along with facial expressions and/or body language of attendees is monitored. Natural language processing, using entity detection, disambiguation, and other language processing techniques, determines a level of deviation in the meeting dialog from the meeting agenda. Computer-implemented image analysis techniques ascertain participant engagement from facial expressions and/or gestures of participants. A deviation alert is presented to the moderator and/or meeting participants when a deviation is detected, allowing the moderator to steer the meeting conversation back to the planned agenda, or alternatively, giving the moderator the option to allow some deviation to let the current track of the meeting continue. Additionally, some embodiments provide a summary at the end of the meeting, along with the follow-up items, and provide a recommendation on who from the meeting either volunteered or gets assigned to follow-up actions based upon analysis of the discussion.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 shows an environment 100 for embodiments of the present invention. Meeting monitoring system 102 comprises a processor 140, a memory 142 coupled to the processor 140, and storage 144. System 102 is an electronic computation device. The memory 142, contains instructions 147, that when executed by the processor 140, perform embodiments of the present invention. Memory 142 may include dynamic random access memory (DRAM), static random access memory (SRAM), magnetic storage, and/or a read only memory such as flash, EEPROM, optical storage, or other suitable memory. In some embodiments, the memory 142 may not be a transitory signal per se. In some embodiments, storage 144 may include one or more magnetic storage devices such as hard disk drives (HDDs). Storage 144 may additionally include one or more solid state drives (SSDs).

System 102 is connected to network 124, which is the Internet, a wide area network, a local area network, or other suitable network. Telephony system 152 is also connected to the network 124. This system enables the connecting of phone calls. Telephony system 152 can be POTS, PBX, VoIP, or other suitable type.

Calendar system 158 is connected to the network 124. This system allows a user to configure and store items on a calendar/schedule. A user can create entries such as meetings, deadlines, classes, etc. In some embodiments, the calendaring system is a computer hosting Microsoft® Outlook®.

Teleconference system 154 is connected to network 124. This system allows users to conference with one another remotely. In some embodiments, it can be a system such as WebEx, GoToMeeting, or another similar type of teleconference system. Items 166 are documents associated with a meeting, such as presentation slides (e.g., via PowerPoint®), text documents (e.g., via Word® documents), spreadsheets (e.g., via Excel®), or images (e.g., .jpeg, .png), etc. These items may be stored within system 154 or linked to in system 154.

When users are in the same location, embodiments do not require a telephony system or teleconference system. Embodiments can be implemented in a live meeting area, for example in a conference room, provided that audiovisual equipment (e.g., cameras and microphones) are present to adequately monitor the participants in the meeting. These cameras and microphones may be standalone, networked products, or may be webcams and microphones from client devices of participants in the room.

Client devices 104 and 106 are connected to network 124. Client devices 104 and 106 are user computing devices, such as tablet computers, laptop computers, desktop computers, smartphones, PDAs, or other suitable devices that can handle incoming and outgoing voice communication. Audio data streams 162 and 164 originate from client devices 104 and 106, respectively, and may contain voice utterances as part of telephone or over-the-web conversations. Although two such client devices are shown, in implementations, more or fewer client devices can be in communication with the system shown over the network 124.

In addition, there is a third client device 168, which is a wearable device, such as a smart watch. Such client device 168 could be in communication in communication with another client device, such as client device 106 via near-field communication protocols, or could be connected directly to network 124. Client device 168 is for receiving alerts which can be audio, visual, or tactile (e.g., vibrator discretely notifies user when he/she is going off topic).

Corpus 170 is also connected to network 124. The corpus 124 includes a dictionary, thesaurus, antonym dictionary, company white papers, or other documents from which keywords can be extracted that are relative to the business of the enterprise.

Figure 2:
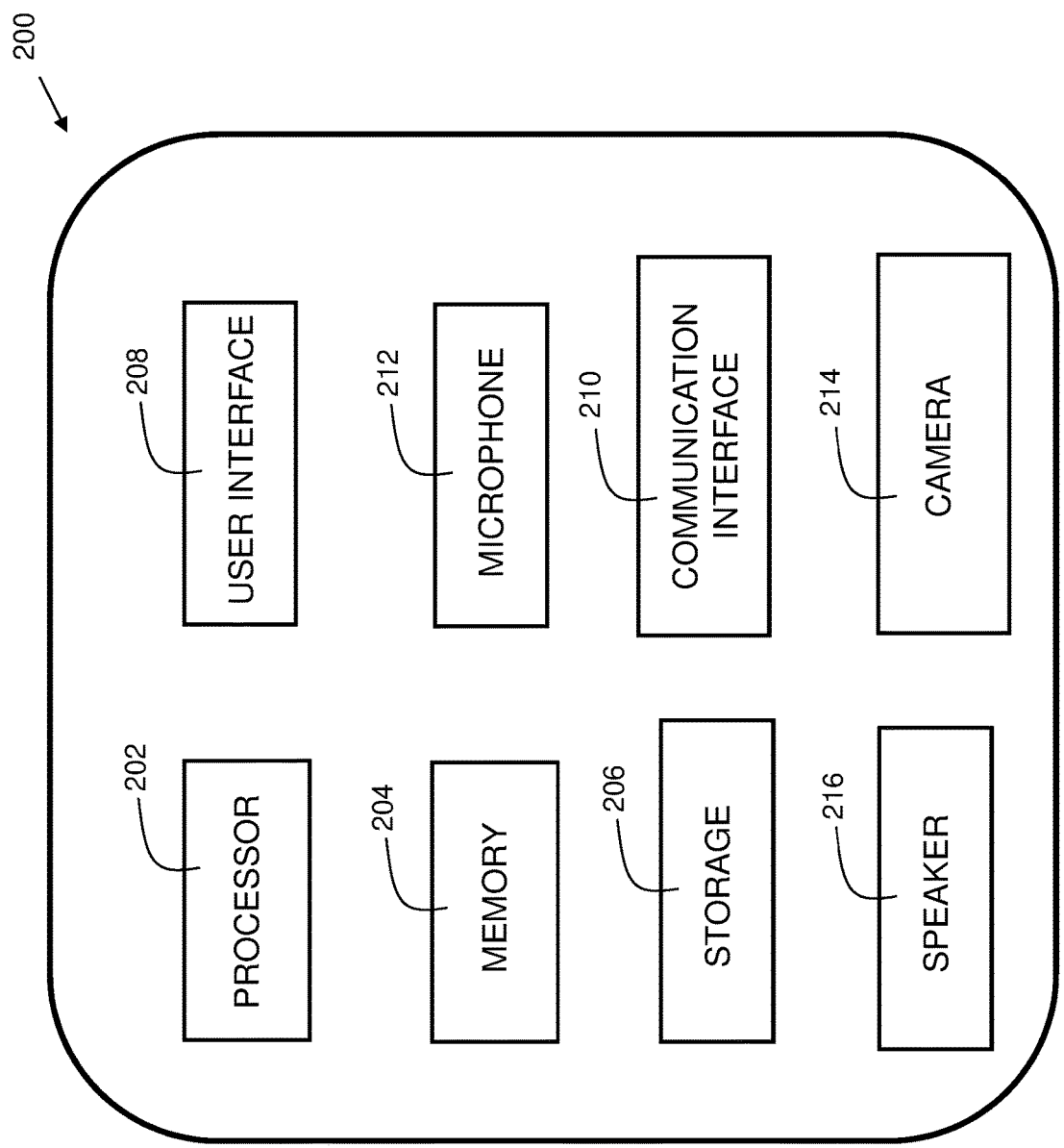
FIG. 2 is a block diagram showing a client device used in embodiments of the present invention.

FIG. 2 is a block diagram showing a client device 200 used in embodiments of the present invention. Device 200 is an electronic communication device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. In embodiments, device 200 may have multiple processors 202, and/or multiple cores per processor. The device 200 may execute an operating system that provides virtual memory management for the device 200. The processor 202 may have one or more cache memories therein.

Device 200 further includes storage 206. In embodiments, storage 206 may include one or more magnetic storage devices such as hard disk drives (HDDs). Storage 206 may additionally include one or more solid state drives (SSDs).

Device 200 further includes a user interface 208, examples of which include a liquid crystal display (LCD), a plasma display, a cathode ray tube (CRT) display, a light emitting diode (LED) display, an organic LED (OLED) display, or other suitable display technology. The user interface 208 may further include a keyboard, mouse, or other suitable human interface device. In some embodiments, user interface 208 may be a touch screen, incorporating a capacitive or resistive touch screen in some embodiments.

Device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth®, Wi-Fi, and/or cellular communication protocols for communication over a computer network.

Device 200 further includes a microphone 212, speaker 216, and camera 214. Speaker 216 may be powered or passive. Camera 214 may have a flash. In embodiments, the camera may be used for acquiring video images of the two or more participants during the meeting, to enable performing a facial expression analysis of each participant for sentiment assessment to determine an engagement level.

Figure 3:
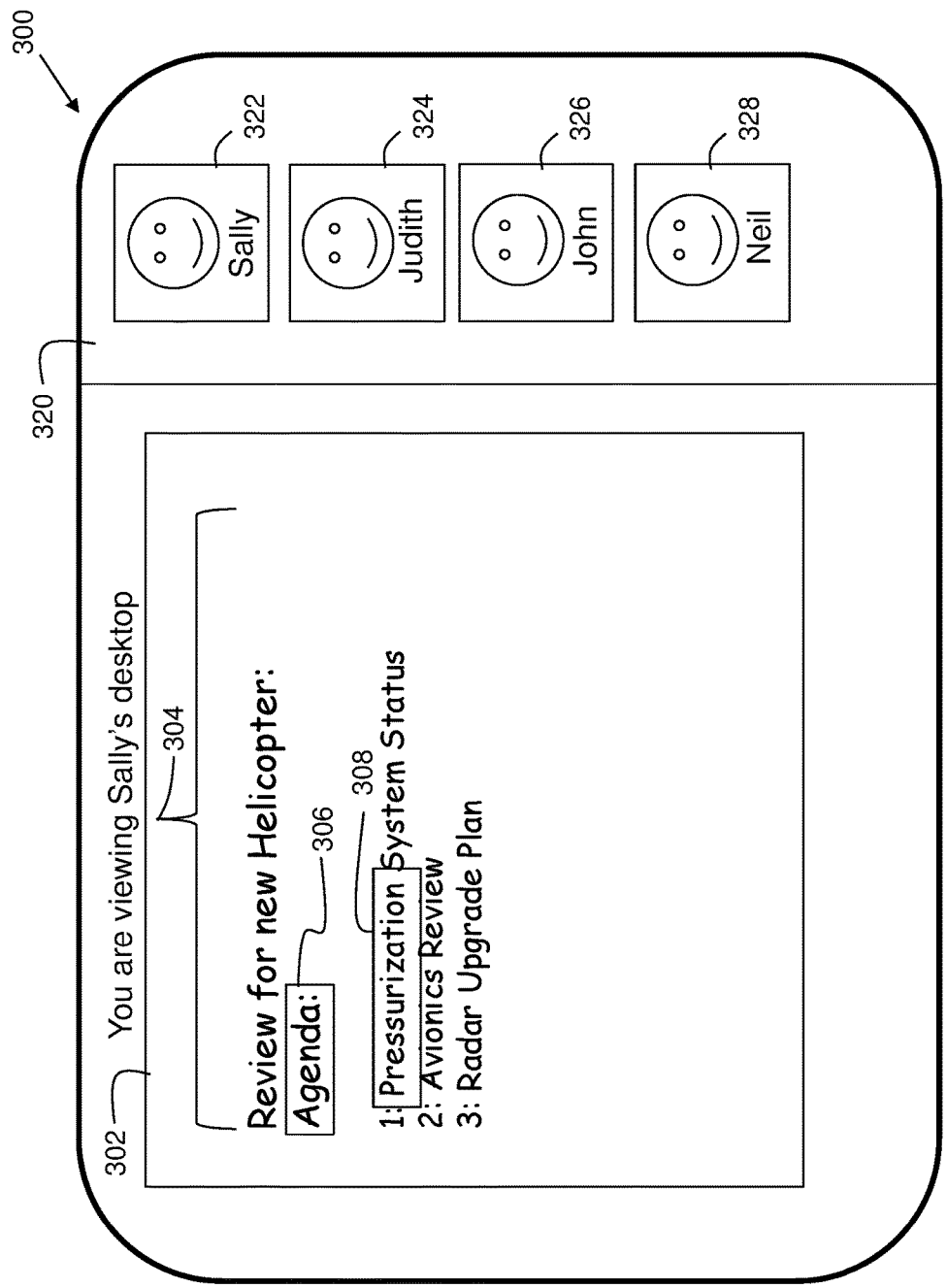
FIG. 3 shows an exemplary meeting presentation with desktop sharing.

FIG. 3 shows an exemplary meeting presentation 300 with desktop sharing. As shown on the user interface, there is a screen having a shared desktop 302 and a participant pane 320. The participants in the meeting are shown in the participant pane 320. A photo, or live camera feed from the participant's client device camera, and the first name of each participant is shown to identify each. In the example, there is the first participant, Sally 322, second participant, Judith 324, third participant, John 326, and fourth participant, Neil 328. In embodiments, meeting participants may opt in to allow collection of data for use by the meeting monitoring system.

At 302, on the shared desktop. there is text 304 including an agenda of the presentation. In some embodiments, identifying one or more agenda items comprises performing an entity detection process on a presentation document associated with the meeting. This may be obtained from shared desktop 302, an uploaded textual document (e.g., Word®), presentation slides (e.g., PowerPoint®), or other suitable method.

In some embodiments, presentation keywords are identified via optical character recognition and natural language processing. In the example, the keywords are "Agenda" at 306 and "Pressurization" at 308. Entity detection, disambiguation, and other natural language processing (NLP) techniques may be used to infer that the displayed content is an agenda for the meeting. These techniques may also pick up on words or phrases that are in the domain of topics on the agenda (e.g., based on the business/company). Here, the keyword, "pressurization" 308, is detected as a possible agenda item (topic).

In some embodiments, identifying one or more agenda items comprises performing an entity detection process on a verbal meeting introduction. Heuristic techniques are used to identify commonly used agenda introduction phrases, such as "today we are going to discuss . . . ", "we are here to talk about . . . ", "the main agenda points are . . . ", "need to go over . . . ", or "need to review . . . ", etc. Based on the detection of such a phrase, embodiments can determine that the agenda is about to be set. A speech-to-text process may be performed on the speech, so that entities can be detected as potential keywords.

The NLP for the screen content or the verbal meeting introduction can include extraction, which is the detection and preparation of named entity occurrences. The extraction phase includes POS (part of speech) tagging, tokenization, sentence boundary detection, capitalization rules, and in-document statistics. The entity detection can further include noun identification, followed by identifying a subset of nouns including proper nouns, and nouns deemed to be topically pertinent. The extracted entities can be used as keywords.

Figure 4:
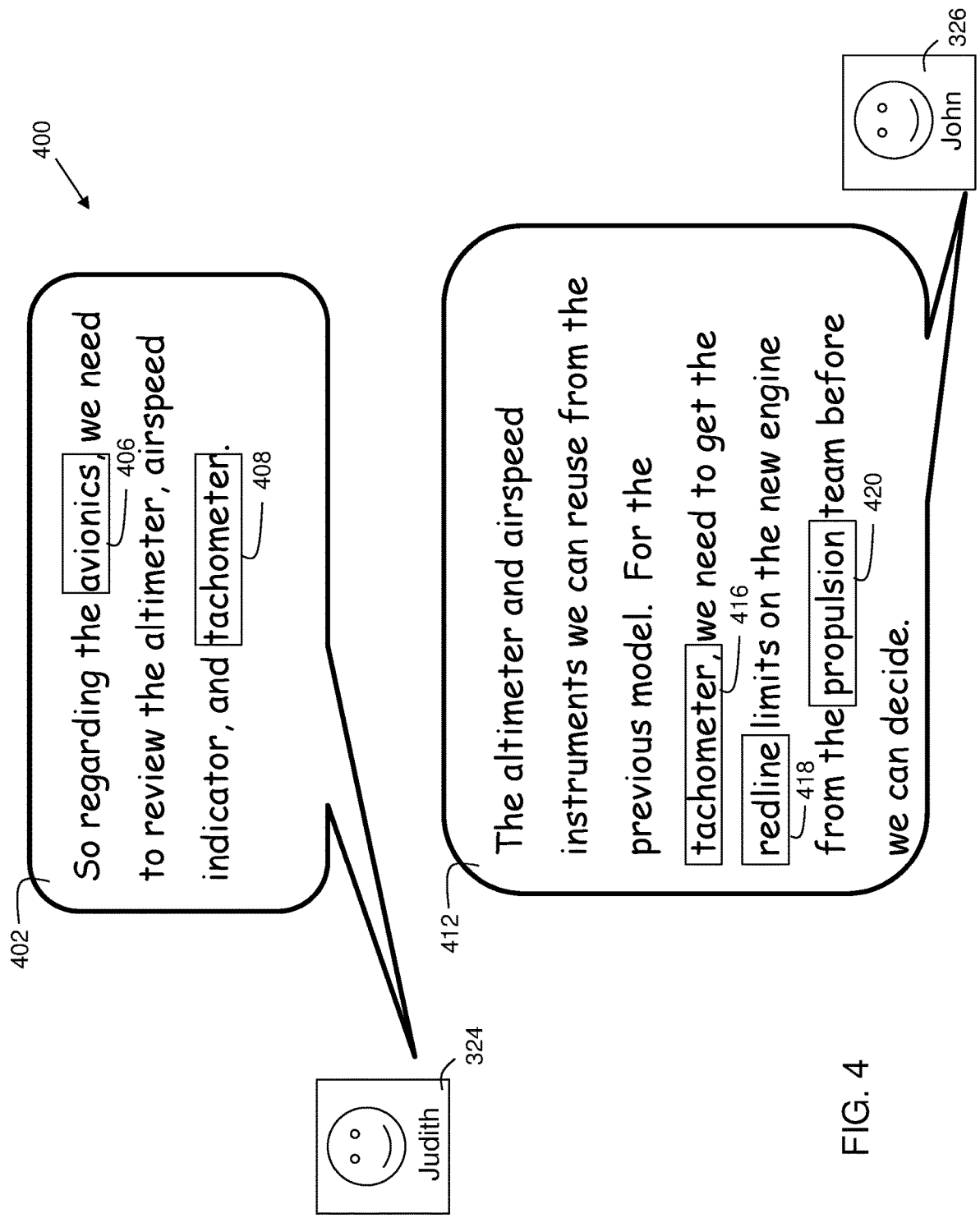
FIG. 4 shows example meeting dialog.

FIG. 4 shows a representation 400 of an example meeting dialog. In the example, participant Judith 324 is the meeting chair (moderator), discussing agenda items. She verbally makes statement 402, "So regarding the avionics, we need to review the altimeter, airspeed indicator, and tachometer." Embodiments detect an agenda introductory phrase, " . . . we need to review . . . ", and it is accordingly inferred that she is discussing agenda items. Therefore, keywords are searched for and located, including "avionics" 406 and "tachometer" 408. When Judith is finished speaking, participant John 326, verbally responds with statement 412, "The altimeter and airspeed instruments we can reuse from the previous model. For the tachometer, we need to get the redline limits on the new engine from the propulsion team before we can decide." Embodiments detect keywords in John's speech, including "tachometer" 416, "redline" 418, and "propulsion" 420.

Embodiments determine that John is staying on topic, based on the sentences with identified keywords in his speech and the keywords in Judith's speech. Two nearby sentences, referred to as "sentence pairs" may be analyzed to determine if they are deviatory or non-deviatory. The keywords may be compared with one another, and to other words, in corpus (170 of FIG. 1) to determine that the keywords are related to the same topic. The corpus may include dictionary definitions, a thesaurus, and/or an antonym dictionary, etc. John's speech has a low deviation score, based on analysis of sentence pairs which indicate that the current discussion within the meeting is related to the agenda, and therefore he is staying on topic.

Figure 5:
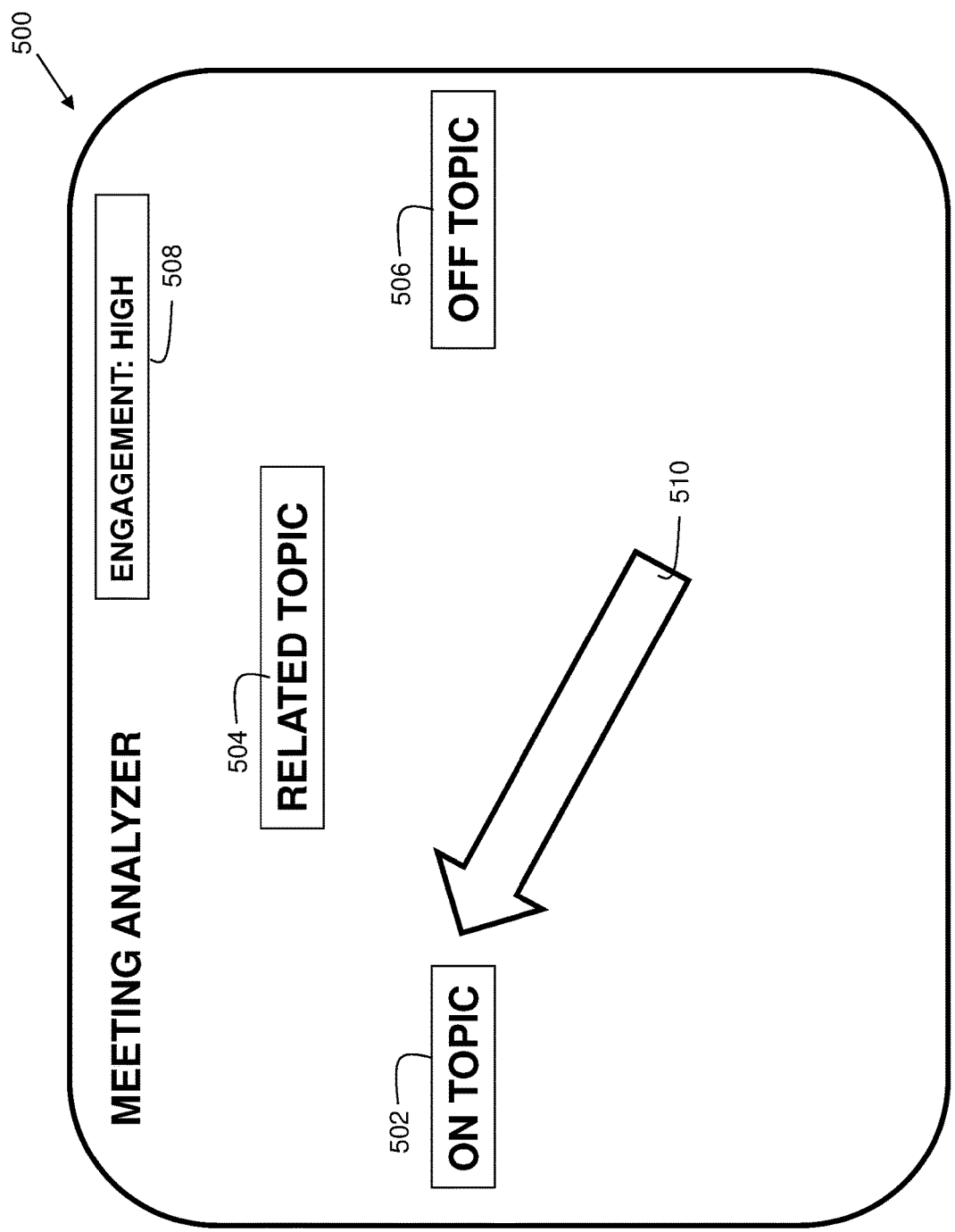
FIG. 5 shows a meeting analyzer output based on the dialog of FIG. 4 in accordance with embodiments of the present invention.

FIG. 5 shows a meeting analyzer output 500 based on the dialog of FIG. 4, in accordance with embodiments of the present invention. Output 500 is an example of a visual dashboard of a meeting track. In the example, it resembles a meter with a pointer 510 pointing in various directions indicating current meeting state based on analysis of the speaker's words to determine whether he/she is on topic. This could be rendered on the moderator's device, such as a laptop or smartphone. Note that the output 500 is an example, and in some embodiments, the same or similar information could be presented differently within the scope of the invention.

In the example, the pointer 510 is pointing to the current meeting state as detected through the analysis. When the speaker is on topic, pointer 510 points in the direction of block 502, which indicates "on topic." When the speaker is deviating from the topic, but to a related topic, the pointer 510 points toward block 504, which indicates a related topic. When the speaker is deviating off topic, without any related topic, the pointer points to block 506, which indicates "off topic."

In addition, a wearable device or mobile phone, etc., could vibrate to discretely alert the speaking participant or moderator that the meeting is going off topic if that should happen. The device could provide a different vibrate pattern for each of indication 504 and indication 506.

Embodiments can include acquiring video images of participants during the meeting, including when each participant is not speaking and instead listening. A facial expression (and/or gesture) analysis of each participant is performed based on the acquired video images. The analysis can determine whether participants are being attentive, are bored, etc. The result of the analysis can be shown on analyzer output 500 at 508. In the example, the engagement level is high, meaning participants are detected to appear interested and attentive based on their facial expressions and/or gestures.

Figure 6:
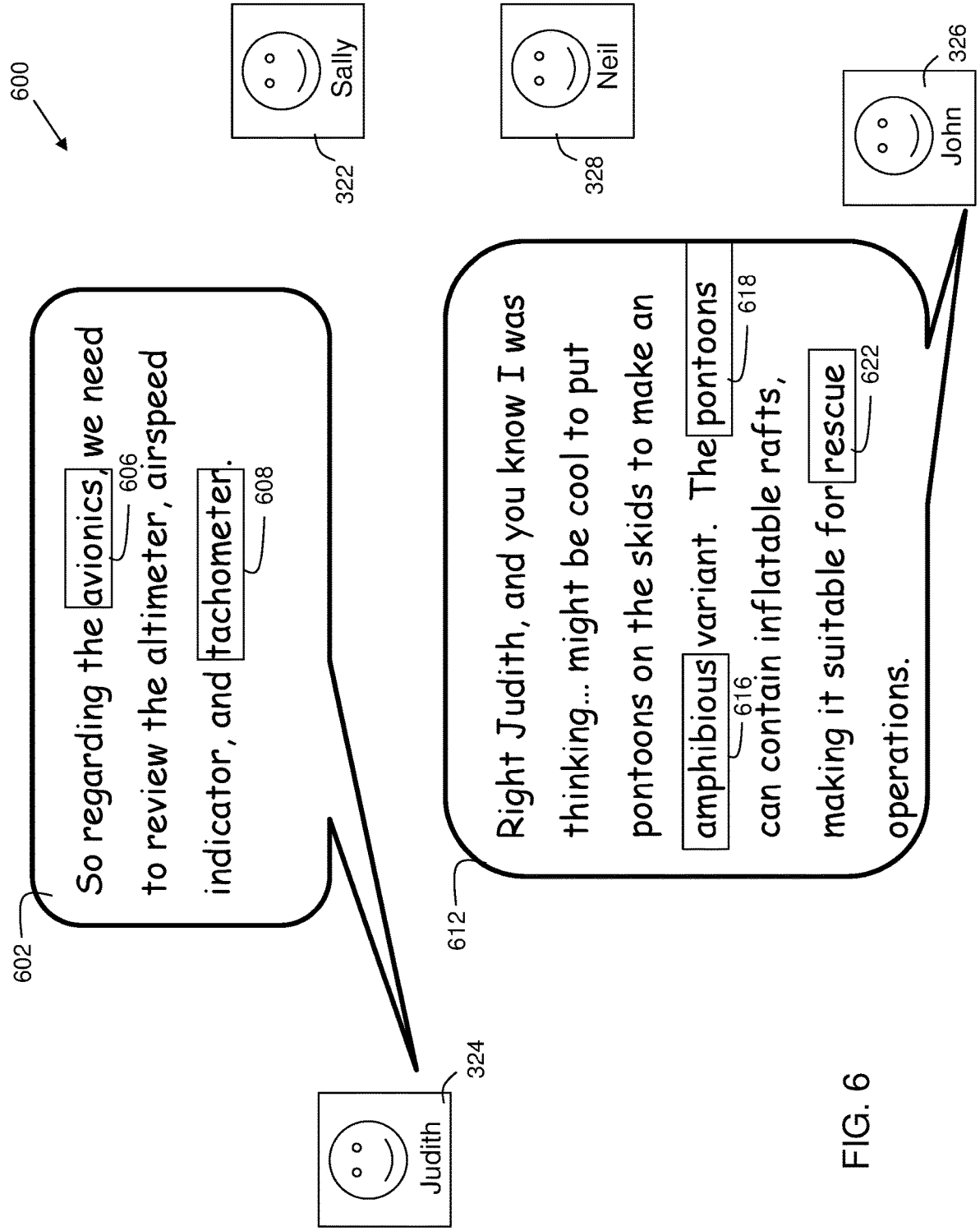
FIG. 6 shows additional example meeting dialog.

FIG. 6 shows an additional representation 600 of an example meeting dialog. In the example, participant Judith 324 is the meeting chair, discussing agenda items in the meeting with John 326, Sally 322, and Neil 328. She verbally makes statement 602, "So regarding the avionics, we need to review the altimeter, airspeed indicator, and tachometer." Embodiments detect an agenda introductory phrase, " . . . we need to review . . . ", and it is accordingly inferred that she is discussing agenda items. Therefore, keywords are searched for and located, including "avionics" 606 and "tachometer" 608.

When Judith is finished speaking, participant John 326 verbally responds with statement 612, "Right Judith, and you know I was thinking . . . might be cool to put pontoons on the skids to make an amphibious variant. The pontoons can contain inflatable rafts, making it suitable for rescue operations." Embodiments detect keywords in John's speech, including "amphibious" 616, "pontoons" 618, and "rescue" 622.

Embodiments determine that John is deviating from the topic, based on the identified keywords in his speech and the keywords in Judith's speech. The keywords may be compared with one another, and to other words, in corpus (170 of FIG. 1) to determine that the keywords are related to the same topic. The corpus may include dictionary definitions, a thesaurus, and/or an antonym dictionary, etc. John's speech has an elevated deviation score, which indicates that the keywords in his speech are related, but not directly relevant to, the agenda topic. Accordingly, this topic may be "parked" in a "parking lot" so that it may be returned to at a later time, such as at the end of the meeting, or in another meeting at another time.

Figure 7:
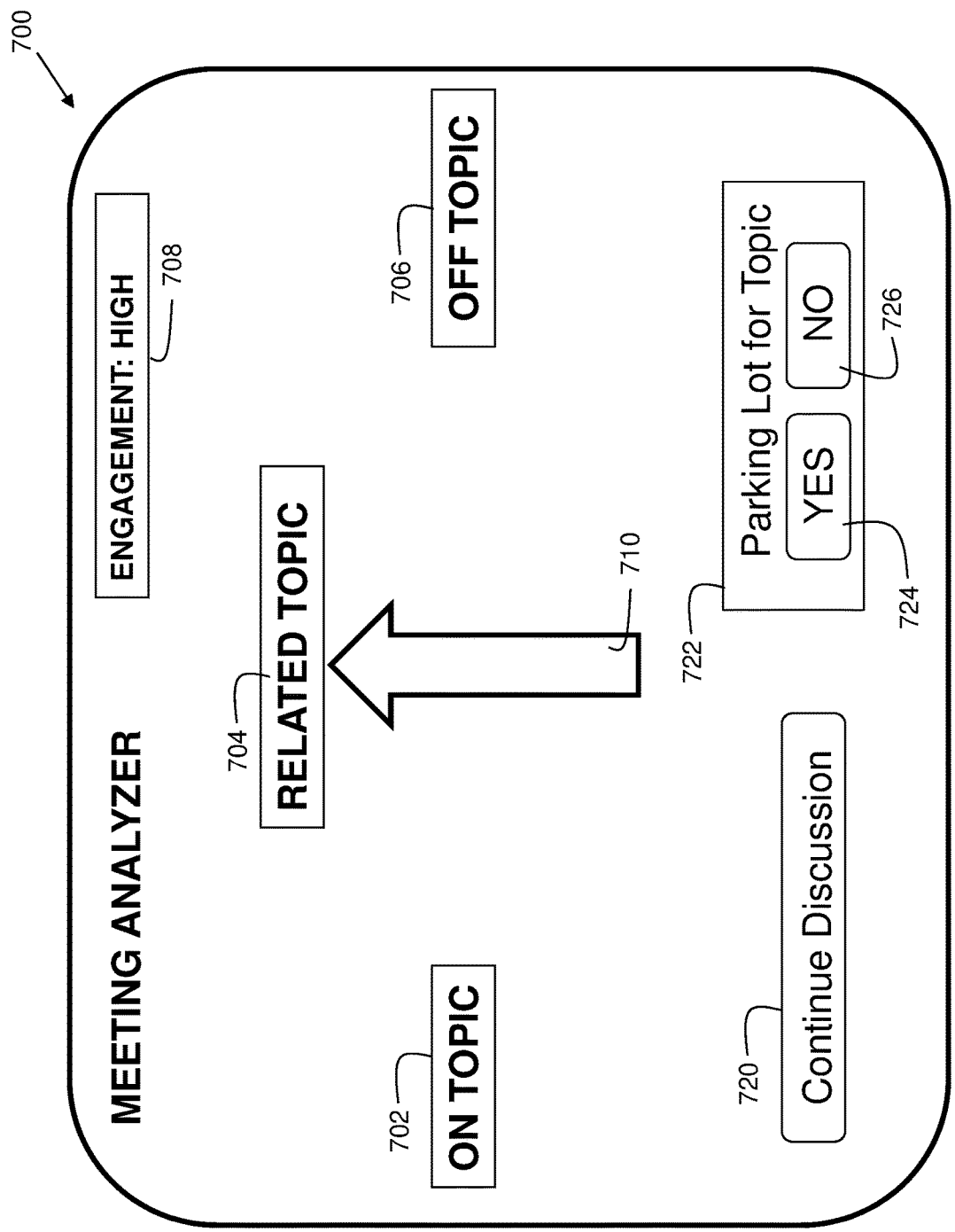
FIG. 7 shows a meeting analyzer output based on the dialog of FIG. 6, in accordance with embodiments of the present invention.

FIG. 7 shows a meeting analyzer output 700 based on the dialog of FIG. 6, in accordance with embodiments of the present invention. Output 700 is an example of a visual dashboard of a meeting track. In the example, it resembles a meter with a pointer 710 pointing in various directions indicating current meeting state based on analysis of the speaker's words to determine whether he/she is on topic. This could be rendered on the moderator's device, such as a laptop or smartphone.

Embodiments can include providing an alert indication to the moderator in response to the deviation exceeding a predetermined threshold. In some embodiments, providing an alert indication comprises providing a visual alert indication. In the example, the pointer 710 is pointing to the current meeting state as detected through analysis. When the speaker is on topic, pointer 710 points in the direction of block 702, which indicates "on topic." When the speaker is deviating from the topic, but to a related topic, the pointer 710 points toward block 704, which indicates a related topic. When the speaker is deviating off topic, without any related topic, the pointer points to block 706, which indicates "off topic."

In some embodiments, providing an alert indication comprises providing an audible alert indication, such as a beep, music clip, etc. In some embodiments, providing an alert indication comprises providing a tactile alert indication. For example, a wearable device or mobile phone, etc., could vibrate to discretely alert the moderator and/or speaking participant that the meeting is going off topic if that should happen. The device could provide a different vibrate pattern for each of indication 704 and indication 706.

Embodiments can include acquiring video images of participants during the meeting, including when each participant is not speaking and instead listening. A facial expression (and/or gesture) analysis of each participant is performed based on the acquired video images. The analysis can determine whether participants are being attentive, are bored, etc. The result of the analysis can be shown on analyzer output 700 at 708. In the example, the engagement level is high, meaning participants are detected to appear interested and attentive based on their facial expressions and gestures.

In the example, the speaker is getting a bit off topic, but the analysis of sentence pairs indicates that the current discussion within the meeting is generally related to the subject of the agenda. Facial expressions and gestures of participants (see Sally 322 and Neil 328 of FIG. 6) indicate engagement. Thus, engagement 708 is still indicated as high. On output 700, the moderator may opt to press the button for "Continue Discussion 720," which suppresses the alert for a duration of time (e.g., 10 min.) to let the discussion continue. Alternatively, the moderator can instead elect to "park" the topic with control 722 by pressing the "yes" button 724 to record the topic in a database/list for revisiting later. The moderator can elect not to park the topic, but acknowledge the notification by pressing the "no" button 726.

Figure 8:
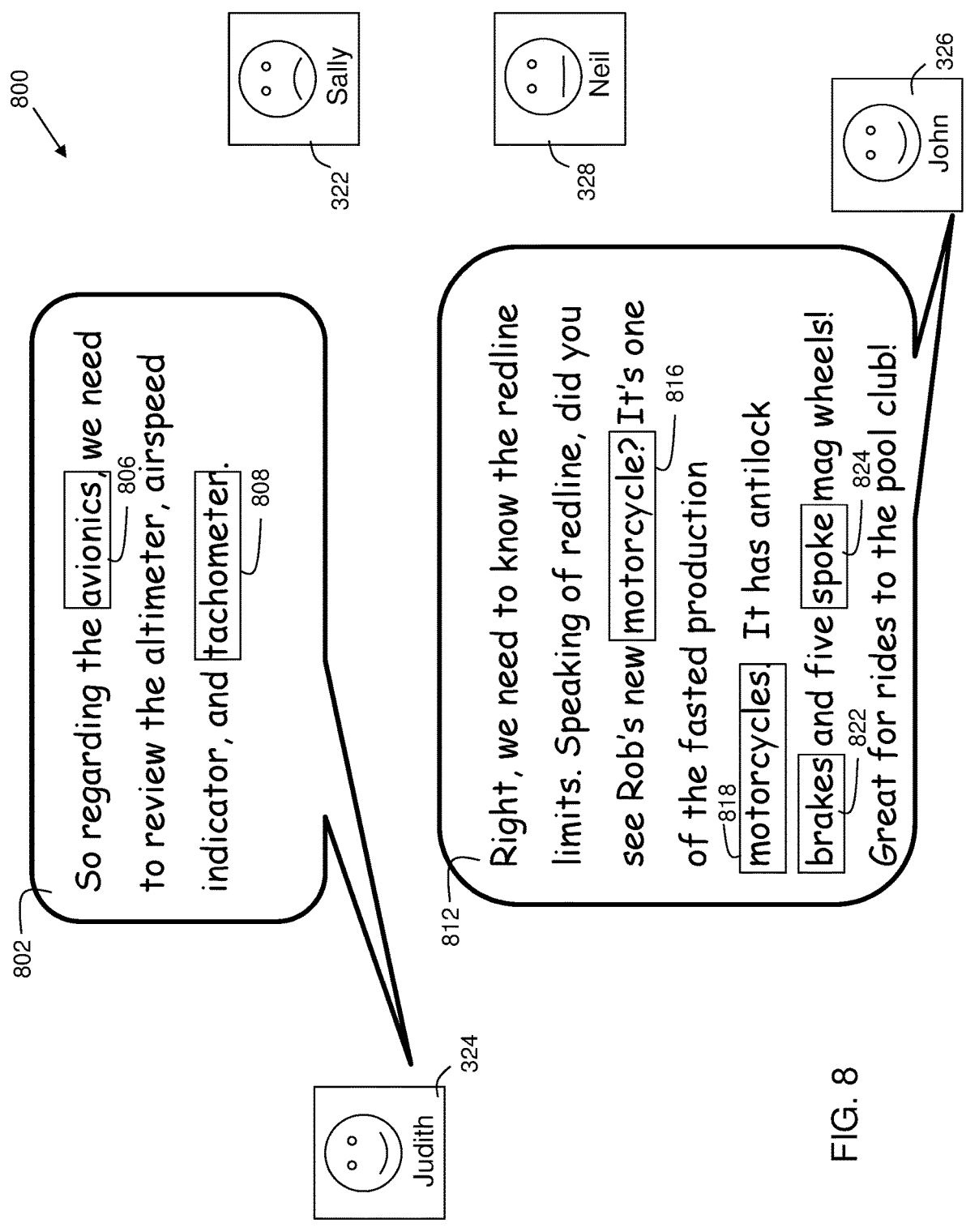

FIG. 8 shows an additional example meeting dialog 800. In the example, participant Judith 324 is the meeting chair, discussing agenda items during a meeting with Sally 322, Neil 328, and John 326. She verbally makes statement 802, "So regarding the avionics, we need to review the altimeter, airspeed indicator, and tachometer." Embodiments detect an agenda introductory phrase, " . . . we need to review . . . ", and it is accordingly inferred that she is discussing agenda items. Therefore, keywords are searched for and located, including "avionics" 806 and "tachometer" 808.

When Judith is finished speaking, participant John 326 verbally responds with statement 812, "Right, we need to know the redline limits. Speaking of redline, did you see Rob's new motorcycle? It's one of the fastest production motorcycles. It has antilock brakes and five spoke mag wheels! Great for rides to the pool club!" Embodiments detect keywords in John's speech, including "motorcycle" 816, "motorcycles" 818, "brakes," 822, and "spoke" 824.

Embodiments determine, based on the analysis of sentence pairs within John's speech and Judith's speech, that John is deviating from the topic. Additionally, keywords may be compared with one another, and to other words, in corpus (170 of FIG. 1) to determine that the keywords are unrelated to one another. The corpus may include dictionary definitions, a thesaurus, and/or an antonym dictionary, etc. John's speech has a high deviation score, which indicates that he is substantially off from the agenda topic.

Figure 9:
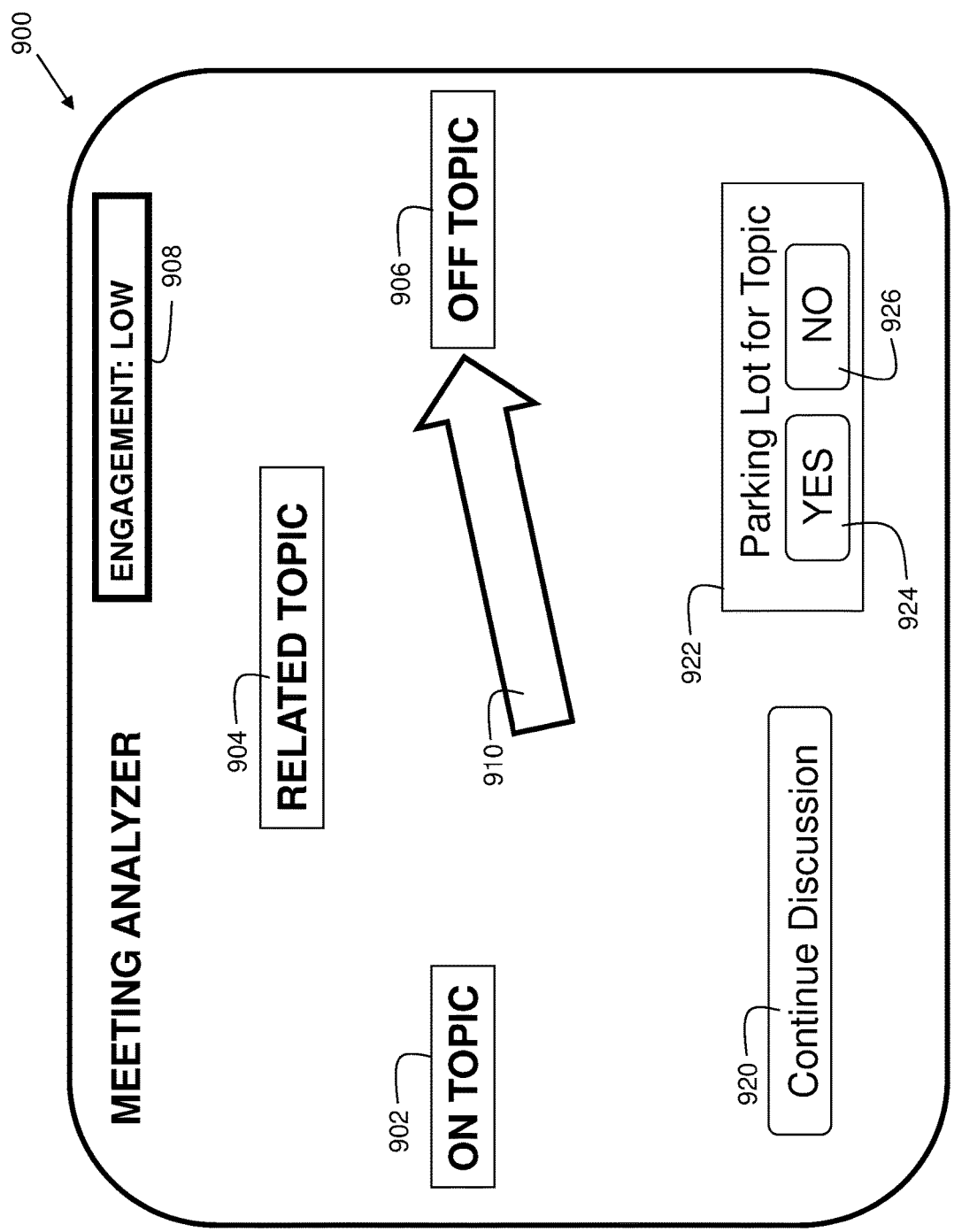
FIG. 9 shows a meeting analyzer output based on the dialog of FIG. 8 in accordance with embodiments of the present invention.

FIG. 9 shows a meeting analyzer output 900 based on the dialog of FIG. 8, in accordance with embodiments of the present invention. Output 900 is an example of a visual dashboard of a meeting track. In the example, it resembles a meter with a pointer 910 pointing in various directions indicating current meeting state based on analysis of the speaker's words to determine whether he/she is on topic. This could be rendered on the moderator's device, such as a laptop or smartphone.

In the example, the pointer 910 is pointing to the current meeting state as detected through analysis. When the speaker is on topic, pointer 910 points in the direction of block 902, which indicates "on topic." When the speaker is deviating from the agenda topic, but to a related topic, the pointer 910 points toward block 904, which indicates a related topic. When the speaker is deviating off topic, without any related topic, the pointer points to block 906, which indicates "off topic."

In addition, a wearable device or mobile phone, etc., could vibrate to discretely alert the moderator or speaking participant that the meeting is going off topic if that should happen. The device could provide a different vibrate pattern for each of indication 904 and indication 906.

Embodiments can include acquiring video images of participants during the meeting, including when each participant is not speaking and instead listening. A facial expression (and/or gesture) analysis of each participant is performed based on the acquired video images. The analysis can determine whether participants are being attentive, are bored, etc. The result of the analysis can be shown on analyzer output 900 at 908. In the example, the engagement level is low, meaning participants are detected to appear disinterested and inattentive based on their facial expressions and/or gestures.

In the example, the speaker (John 326) is substantially off topic. Facial expressions of participants (see Sally 322 and Neil 328 of FIG. 8) indicate disengagement. Thus, engagement 908 is indicated as low. On output 900, the moderator may opt to press the button for "Continue Discussion 920," which suppresses the alert for a duration of time (e.g., 10 min) to let the discussion continue. Alternatively, the moderator can instead elect to "park" the topic with control 922 by pressing the "yes" button 924 to record the topic in a database/list for revisiting later. The moderator can elect not to park the topic, but acknowledge the notification by pressing the "no" button 926.

Figure 10:
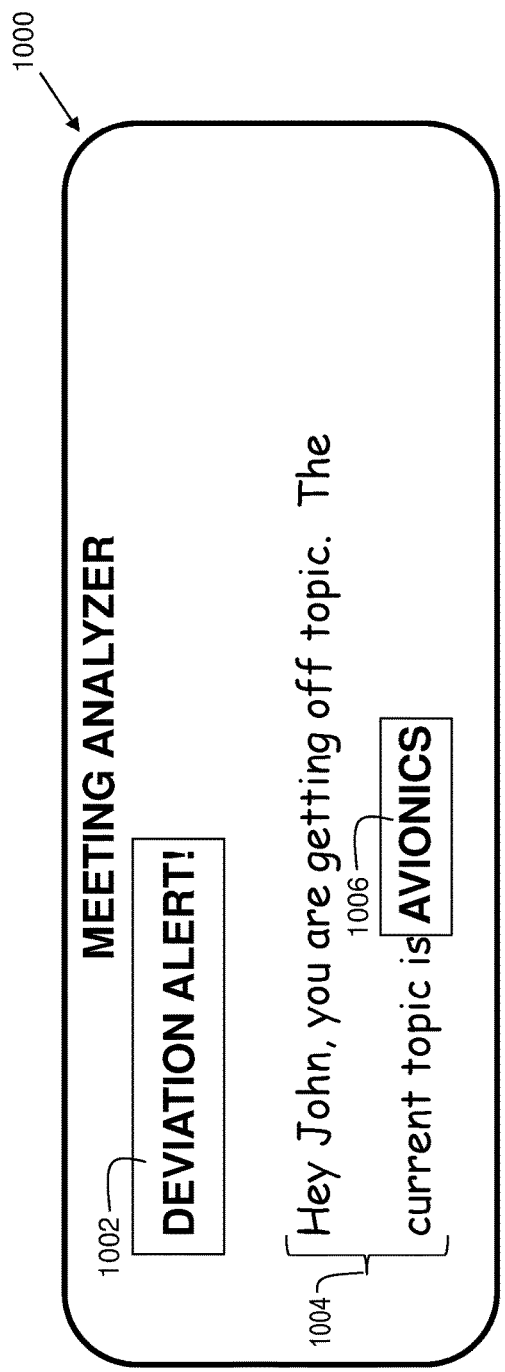
FIG. 10 shows an exemplary participant deviation alert in accordance with embodiments of the present invention.

FIG. 10 shows an exemplary participant deviation alert 1000 in accordance with embodiments of the present invention. Embodiments can include identifying a deviation-inducing participant. The identification can be based on detection of the participant who is speaking based on the input into a microphone. The microphone of the participant which is active, indicates that participant as deviation-inducing.

An alert indication is provided to the deviation-inducing participant/speaker. The meeting analyzer can display a visual deviation alert. A visual display alert may pop up on his/her screen or in the meeting portal. At 1002, there is shown the alert. At 1004, there is shown a message that indicates the current topic via a keyword. In the example, it says, "Hey John, you are getting off topic. The current topic is avionics." Avionics is a keyword 1006 that was detected from the meeting agenda. A tactile alert can be provided via vibration of a wearable device. This discretely lets the speaker know to get back on topic.

Some embodiments include issuing the participant engagement alert to participants determined to be exhibiting a non-engagement sentiment. Accordingly, in some embodiments, a similar alert can be sent to participant 322 and participant 328 in FIG. 8, for example. In this case, the alert might convey a more generic message such as "Stay focused on the current topic of avionics."

Figure 11:
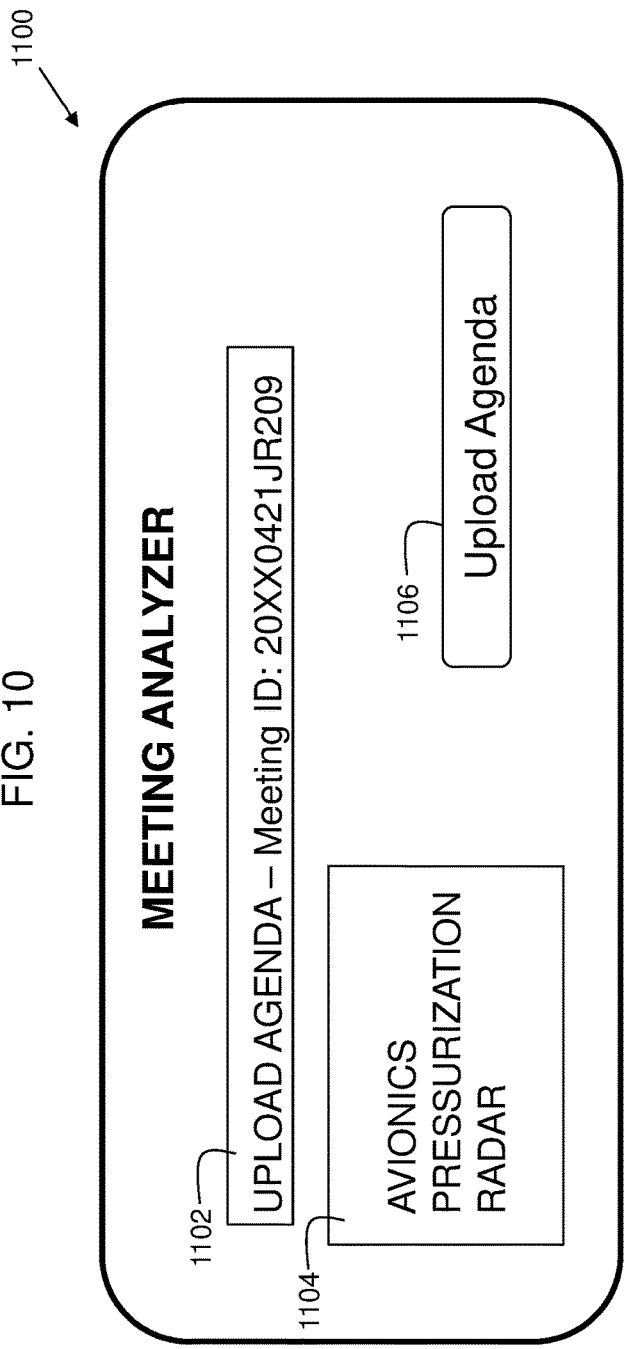
FIG. 11 shows an exemplary agenda upload user interface in accordance with embodiments of the present invention.

FIG. 11 shows an exemplary agenda upload user interface 1100 in accordance with embodiments of the present invention. In embodiments, identifying one or more agenda items comprises receiving an agenda list. In an example, a list of agenda items 1104 associated with a meeting identified in ID field 1102. A participant can press button 1106 to send it from client device 104 or 106 to system 102.

Figure 12:
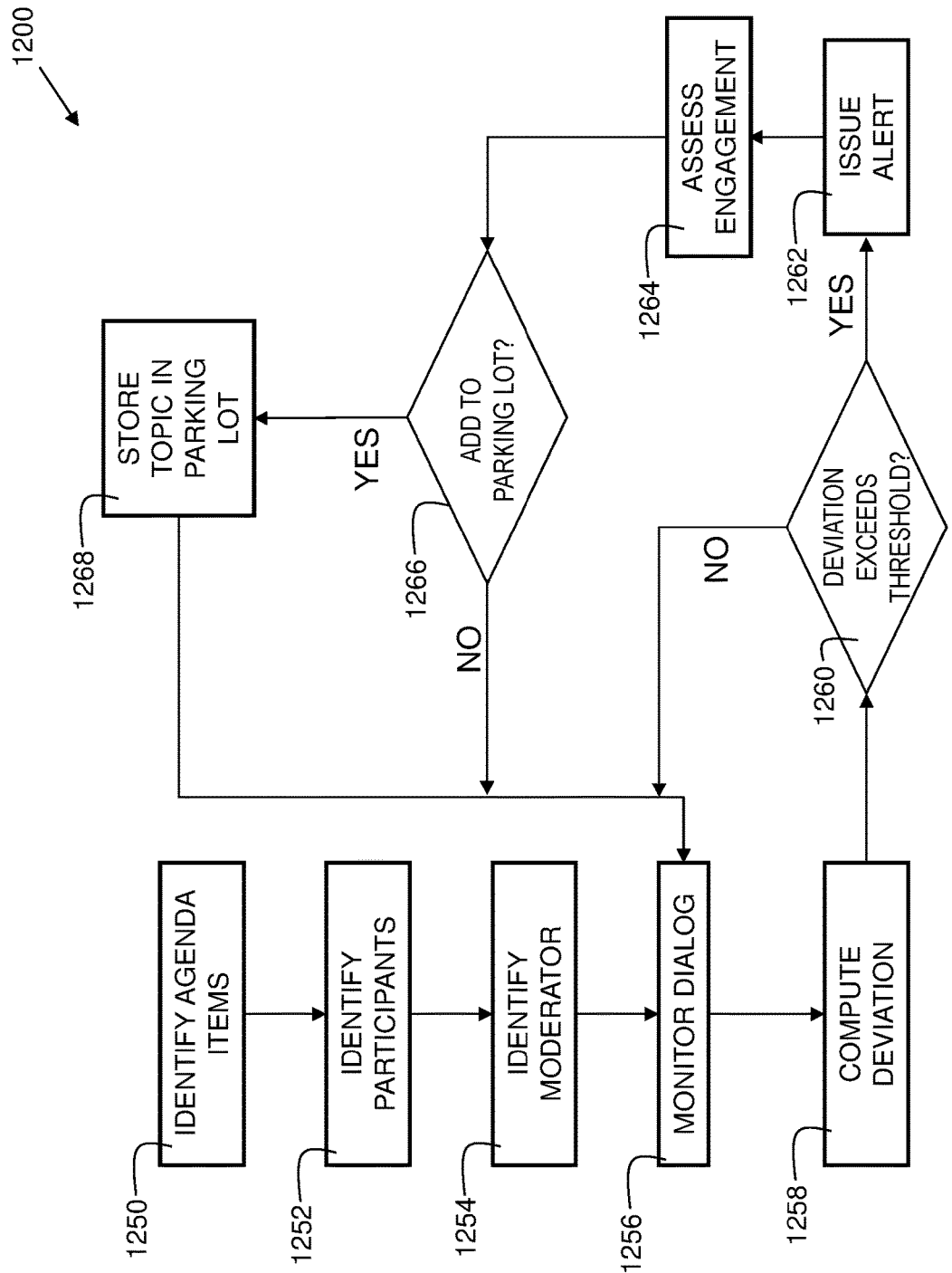
FIG. 12 is a flowchart indicating process steps for embodiments of the present invention.

FIG. 12 is a flowchart 1200 indicating process steps for embodiments of the present invention. At 1250, agenda items are identified. At 1252, participants are identified. At 1254, a moderator is identified. At 1256, a dialog among the participants is monitored. At 1258, a deviation is computed. At 1260, it is determined whether the deviation exceeds a threshold.

If, at 1260, it is determined "no", then the process returns to block 1256 where dialog is monitored. If, at 1260, it is determined that the deviation does exceed the threshold, an alert is issued at 1262. An engagement is then assessed at 1264.

It is then determined whether the topic is added to the parking lot, at 1266. If no, the process returns to block 1256 where the dialog among the participants is monitored. If yes, then the topic is stored in the parking lot at 1268.

Embodiments can include identifying one or more agenda items for the meeting. Participant dialog during the meeting is monitored. A dialog topic is identified based on the participant dialog. A deviation is computed between the dialog topic and the one or more agenda items. A notification of the deviation is provided to the meeting moderator.

Figure 13:
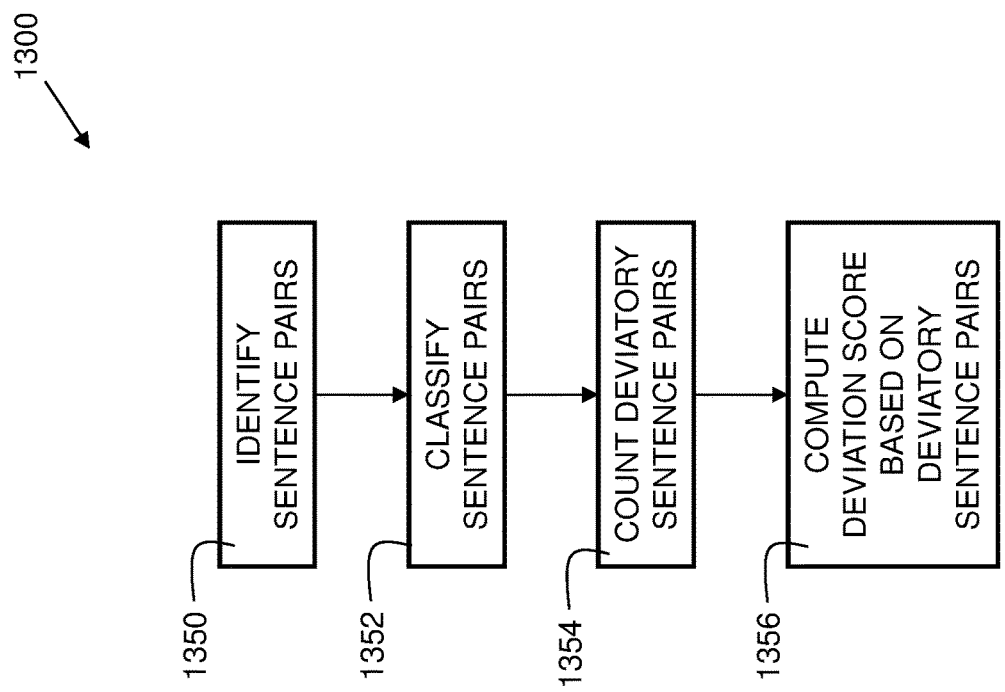
FIG. 13 is a flowchart indicating additional process steps for embodiments of the present invention.

FIG. 13 is a flowchart 1300 indicating additional process steps for embodiments of the present invention. At 1350, a plurality of sentence pairs is identified within the participant dialog. At 1352, the sentence pairs are classified as deviatory or non-deviatory. At 1354, a number of deviatory sentence pairs are counted for a predetermined time interval. At 1356, a deviation score is computed as a function of the number of deviatory sentence pairs counted within the predetermined time interval. In embodiments, the deviation score D can be computed as:

$$D = K_1 X + K_2 Y$$

where:
X is number of deviatory sentence pairs in a first duration and
Y is the number of deviatory sentence pairs in a second duration
$K_1$ and $K_2$ are constants In embodiments, the sentence pairs are part of a compositional distributed semantic model (CDSM). Embodiments may utilize a corpus such as Sentences Involving Compositional Knowledge (SICK).

Distributional Semantic Models (DSMs) approximate the meaning of words with vectors summarizing their patterns of co-occurrence in corpora. Recently, several compositional extensions of DSMs (Compositional DSMs, or CDSMs) have been proposed, with the purpose of representing the meaning of phrases and sentences by composing the distributional representations of the words they contain. SICK (Sentences Involving Compositional Knowledge) provides a benchmark for CDSM testing. The SICK corpus includes about 10,000 English sentence pairs that include many examples of the lexical, syntactic, and semantic phenomena that CDSMs are expected to account for, but do not require, dealing with other aspects of existing sentential data sets that are not within the scope of CDSMs.

Some embodiments estimate the semantic similarity between a pair of sentences by taking the average of the word embeddings of all words in the two sentences, and calculating the cosine between the resulting embeddings.

In embodiments, a Word Mover's Distance (WMD) is computed as part of a similarity estimate. WMD uses the word embeddings of the words in two texts in order to measure the minimum distance that the words in one text need to "travel" in semantic space to reach the words in the other text. Disclosed embodiments ascertain deviation by utilizing the relationship of the lower the similarity, the greater the deviation from the centralist theme of the meeting agenda. In some situations, two sentences may have no words in common, yet by matching the relevant words, WMD is able to accurately measure the (dis)similarity between the two sentences as a sentence dissonance value.

In some embodiments, the deviation factor D is computed as follows:

$D = f$(Sentence Dissonance(from Sentence Pairing), Word Mover's Distance)+$f$[Body Language(facial and other body positioning)]+$f$[vocal(raised tone above normal base line of individual)]

Where f(Sentence Dissonance(from Sentence Pairing), Word Mover's Distance) is a function of deviation based on sentence dissonance and word movers distance, f [Body Language (facial and other body positioning)] (e.g., obtained from images of meeting participants), and f[vocal (raised tone above normal base line of individual)], based on tonal analysis of meeting participants.

In embodiments, disagreements and/or conflicts are identified. A threshold is determined to establish an inflection point. The inflection point represents an acceptable level of disagreement as specified by the moderator (or other administrator). Once the inflection point is exceeded, then the current discussion is deemed to be a deviation. This deviation can be provided as an audible, visual, and/or tactile alert to the moderator and/or other meeting participants.

Figure 14:
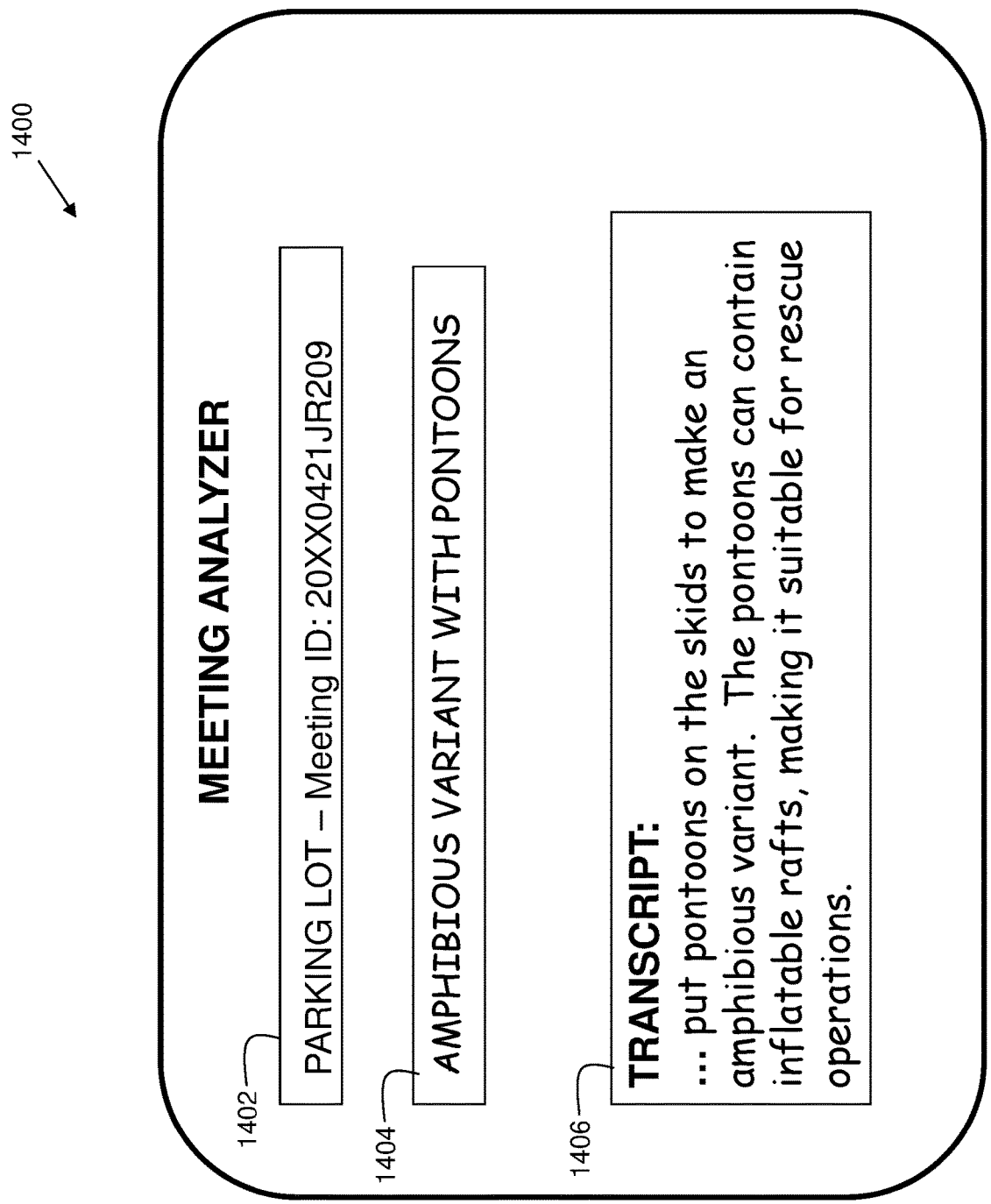
FIG. 14 shows an exemplary meeting parking lot user interface in accordance with embodiments of the present invention.

FIG. 14 shows an exemplary meeting parking lot user interface 1400 in accordance with embodiments of the present invention. In field 1402, there is shown a meeting identifier. At 1404, there is shown a scenario summary of the topic discussed that has been parked. The summary is generated by natural language processing of a speech-to-text transcription of the call. In some embodiments, the scenario summary is derived from the entity detection. The entity detection can include extraction, which is the detection and preparation of named entity occurrences. The extraction phase includes POS (part of speech) tagging, tokenization, sentence boundary detection, capitalization rules, and in-document statistics. The entity detection can further include noun identification, followed by identifying a subset of nouns including proper nouns, and nouns deemed to be topically pertinent. The extracted entities can be used as keywords within the scenario summary. At 1406, a speech-to-text excerpt from the transcript itself is displayed. These items will be helpful when the moderator chooses to return to the parked topic.

In embodiments, computer-implemented facial analysis is used in sentiment assessment. Human faces include various facial features such as eyes, lip corners, eyebrows, and the brow. These are just a small sample of the various facial features that may be monitored/analyzed to determine facial expression and, thus, current mood or sentiment of a meeting participant. In some embodiments, the mood of participants is monitored to determine level of engagement. In some embodiments, performing a mood analysis comprises identifying one or more action units in the face image. The Facial Action Coding System (FACS) is a system to classify human facial movements by their appearance on the face. Movements of individual facial muscles are encoded by FACS from slight different instant changes in facial appearance. Using FACS, embodiments can implement a computerized method to analyze a wide variety of anatomically possible facial expressions, deconstructing them into the specific Action Units (AUs).

Using action units, the mood or sentiment of the author of an electronic communication may be derived if a user-facing camera captures images of the user. For example, AU12 (Lip Corner Puller) is associated with movement of the zygomaticus muscles during a smile. AU02 (Outer Brow Raiser) is associated with movement of the frontalis muscles during a look of surprise. A variety of action units may be combined to infer a given facial expression. Thus, as a user looks at his/her electronic communication device (e.g., tablet computer), the user-facing camera on the device can acquire one or more images of the user. Embodiments can perform an action unit (AU) identification process, and infer a mood of the user from the one or more images. If a user appears to be smiling, it may be inferred that he/she is engaged and likes the conversation. If a participant is frowning, it may be inferred that he/she is bored and is not engaged.

In some embodiments, eye gaze is monitored instead of, or in addition to, the FACS technique. Many techniques are available for monitoring movement of eye gaze. A common type is pupil center corneal reflection (PCCR). In such, a light source is used to illuminate the eye resulting in visible reflections. A camera is used to obtain imagery of the eye showing these reflections. The imagery obtained by the camera is then used to locate the reflection of the light source on the cornea (glint) and in the pupil. A vector, formed by the angle between the cornea and pupil reflections, can be computed. The direction of the computed vector, in combination with other geometrical features of the reflections, is then utilized to compute the direction of gaze. This is one example of how eye gaze can be monitored, but all suitable techniques are included within the scope of the invention. In implementations, if a participant's eyes are on the client device screen consistently, he/she appears engaged. If the participant's eyes are gazing in another direction for an extended period of time (e.g., 15 seconds), it is inferred that he/she is bored and unengaged.

Figure 15:
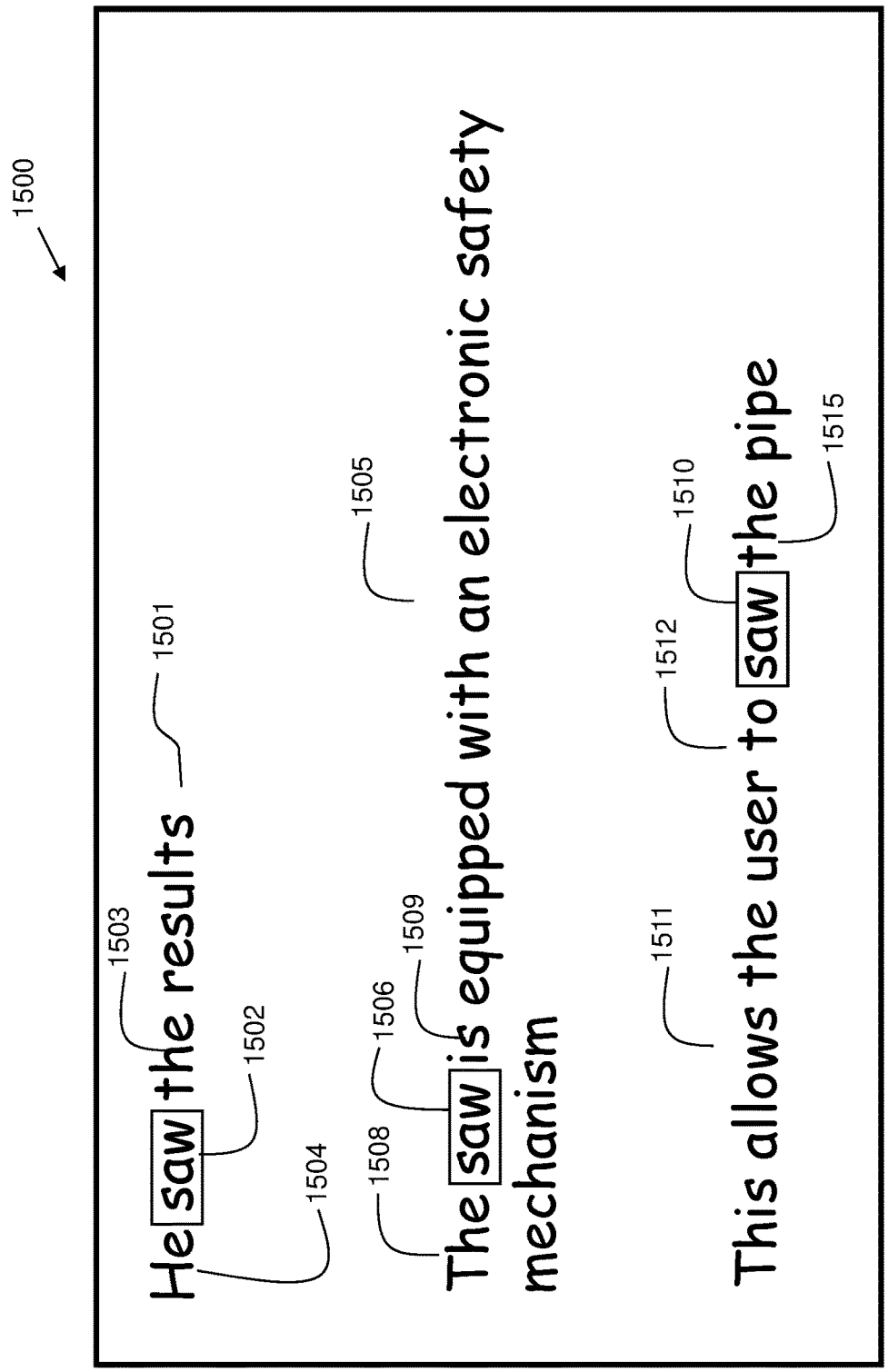
FIG. 15 shows an example of disambiguation in accordance with embodiments of the present invention.

FIG. 15 shows an example 1500 of disambiguation in accordance with embodiments of the present invention. Disambiguation is one of the processes that may be utilized for natural language processing in embodiments of the present invention. Speech-to-text, or provided text is tokenized into words and tagged with parts of speech. For some words, there can be more than one meaning and/or part of speech. FIG. 15 shows a disambiguation example with the word "saw." In phrase 1501, the word "saw" 1502 is a past tense verb. In embodiments, a machine learning natural language analysis module may identify the prior token 1504 to the word "saw" as a pronoun, and the following token 1503 as an article. In training a classifier, the pattern of pronoun-token-article may be associated with a verb, and thus the token is interpreted as a verb.

In phrase 1505, the word "saw" 1506 is a noun for a cutting tool. In embodiments, a machine learning natural language analysis module may identify the prior token 1508 to the word saw as an article, and the following token 1509 as a verb. In training a classifier, the pattern article-token-verb may be associated with a noun, and thus the token is interpreted as a noun.

In phrase 1511, the word "saw" 1510 is a verb for cutting. In embodiments, a machine learning natural language analysis module may identify the prior token 1512 to the word "saw" as part of an infinitive form, and the following token 1515 as an article. In training a classifier, the pattern "to"-token-article may be associated with a verb, and thus the token is interpreted as a verb. These classifiers and techniques for disambiguation are examples, and other classifiers and techniques are possible. Thus, embodiments include performing a computerized natural language analysis process to derive a level of deviation of a sentence pair by performing a disambiguation process.

Figure 16:
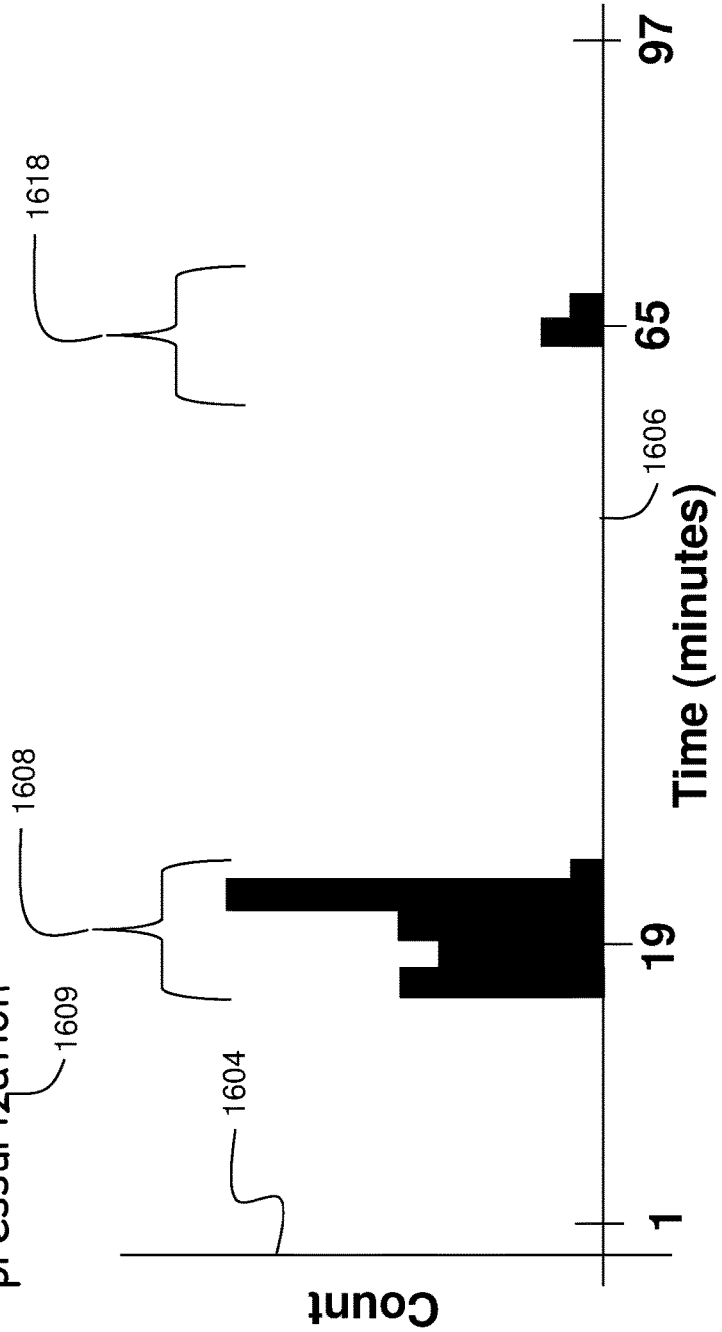
FIG. 16 shows an example of a dispersion analysis in accordance with embodiments of the present invention.

FIG. 16 shows an example 1600 of a dispersion analysis in accordance with embodiments of the present invention. In a meeting transcript, a particular word may have a non-uniform distribution during the conversation through the duration of a meeting. In the example 1600, a dispersion analysis is performed for the word "pressurization" 1609. A graph comprises a horizontal axis 1606 representing time in minutes within the meeting, and a vertical axis 1604 representing a number of occurrences of word 1609 in the transcript of the meeting at a given point in time. As can be seen in the graph, the presence of the word 1609 is concentrated in certain time periods. A maximum concentration 1608 is identified in the area around minute 19, and in a smaller concentration 1618 occurs around minute 65. In some embodiments, the meeting moderator may receive a notification around minute 65 that the current topic may be reverting to a previously covered topic. Embodiments may include performing a computerized natural language analysis process to derive a level of deviation of a sentence pair by performing a dispersion analysis.

FIG. 17 shows an example 1700 of a bigram analysis in accordance with embodiments of the present invention. In a bigram analysis, a pair of words in a particular order may be searched within a speech-to-text transcript of a meeting. In this example, the bigram "computer storage" is searched within a text excerpt. Three occurrences, indicated as 1702A, 1702B, and 1702C are present in the text passage. In embodiments, the usage of bigrams, trigrams, or more generally, n-grams (number=n), may be used to improve relevance in analyzing a transcript of a meeting. Embodiments can include performing a computerized natural language analysis process to derive a level of deviation of a sentence pair by performing a bigram analysis.

FIG. 18 shows an additional example meeting dialog 1800. In the example, participant Judith 324 is the meeting chair, discussing agenda items during a meeting with Sally 322, Neil 328, and John 326. She verbally makes statement 1802, "So regarding the avionics, we need to figure out how that is going to interface with the guidance system. Guidance system integration is an open issue." Embodiments detect phrases pertaining to the guidance system, along with one or more action item phrases such as "open issue," "need to define," "need to resolve", and the like. It is accordingly, inferred that she is discussing action items for follow up. Therefore, keywords are searched for and located, including "avionics" 1806 and "guidance system" 1808.

When Judith is finished speaking, participant John 326 verbally responds with statement 1812, "I've been researching various guidance systems. An inertial based system using gyroscopes may provide reliability if satellites go down. However, it would be good to use GPS and LORAN as well." Embodiments detect keywords in John's speech, including "gyroscopes" 1816, "GPS" 1822, and "LORAN" 1824. Embodiments determine, based on those keywords and/or sentence pairs, that John is actively discussion guidance systems. Embodiments can automatically identify an action item from a meeting, and assign a meeting participant as an owner for that action item, based on natural language processing of the dialog of the meeting. This information can then be presented in a meeting action item owner identifier user interface.

Figure 19:
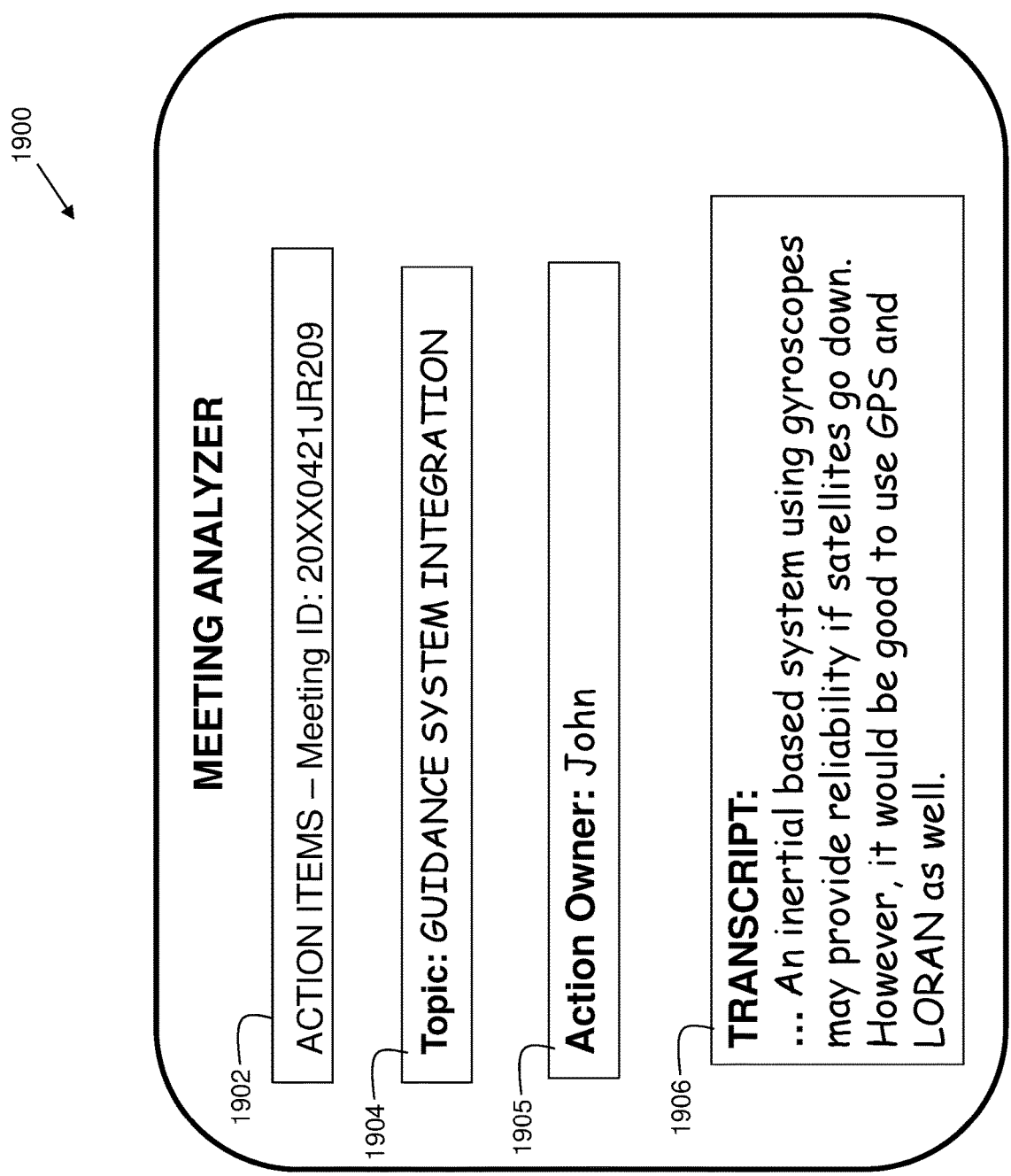
FIG. 19 shows an exemplary meeting action item owner identifier user interface.

FIG. 19 shows an exemplary meeting action item owner identifier user interface 1900 in accordance with embodiments of the present invention. In field 1902, there is shown a meeting identifier. At 1904, there is shown a topic discussed at the meeting. The summary is generated by natural language processing of a speech-to-text transcription of the call. In some embodiments, the topic is derived from the entity detection. The entity detection can include extraction, which is the detection and preparation of named entity occurrences. The extraction phase includes POS (part of speech) tagging, tokenization, sentence boundary detection, capitalization rules and in-document statistics. The entity detection can further include noun identification, followed by identifying a subset of nouns including proper nouns, and nouns deemed to be topically pertinent. The extracted entities can be used as keywords within the scenario summary. At 1905, an action owner is identified. The action owner can be identified based on voluntary phrases as detected by the natural language processing of disclosed embodiments. Voluntary phrases can include phrases such as "I'll do that," "Assign that to me," etc. Alternatively, disclosed embodiments may assign an action owner automatically, based on detected speech patterns, percentage of time a participant spent discussing a particular item, or other suitable criteria. At 1906, a speech-to-text excerpt from the transcript itself is displayed. These items will be helpful when the for the action owner when he/she follows up on the topic listed at 1904.

As can now be appreciated, disclosed embodiments provide improvements in the technical field of monitoring organizational meetings. Embodiments may be used in face-to-face meetings in a conference room, video conference meetings, and/or teleconference meetings. Disclosed embodiments provide a computer-implemented technique for monitoring deviation from a meeting agenda. Furthermore, the level of deviation is quantified using a deviation score to indicate how much deviation has occurred. A meeting moderator and meeting agenda are obtained. Meeting dialog, along with facial expressions and/or body language of attendees is monitored. Natural language processing, using entity detection, disambiguation, and other language processing techniques, determines a level of deviation in the meeting dialog from the meeting agenda. Computer-implemented image analysis techniques ascertain participant engagement from facial expressions and/or gestures of participants. A deviation alert is presented to the moderator and/or meeting participants when a deviation is detected, allowing the moderator to steer the meeting conversation back to the planned agenda. When meetings go off track, valuable time may be wasted. Thus, disclosed embodiments enable improved organizational efficiency by managing time resources, which are valuable for any organization.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for monitoring a meeting with two or more participants, wherein one participant of the two or more participants is a meeting moderator, the method comprising:
    identifying, by a computer, one or more agenda items for the meeting;
    monitoring, by the computer, participant dialog continuously in real time during the meeting using natural language processing;
    identifying, by the computer, a dialog topic based on the participant dialog;
    identifying, by the computer, a plurality of sentence pairs within the participant dialog;
    classifying, by the computer, each sentence pair of the plurality of sentence pairs as deviatory or non-deviatory from the one or more agenda items;
    counting, by the computer, a number of deviatory sentence pairs for a predetermined time interval;
    computing, by the computer, a deviation score as a function of the number of deviatory sentence pairs counted within the predetermined time interval;
    determining, by the computer, that the number of the deviatory sentence pairs exceeds a predetermined threshold, based on the deviation score;
    responsive to the determining, generating, by the computer, a notification of the deviation, the notification including a continuous updating of a level of deviation displayed in real time during the meeting on a visual dashboard based on the deviation score; and
    providing, by the computer, the notification to a mobile device of the meeting moderator;
    wherein the computer comprises a processor and memory.

2. The computer-implemented method of claim 1, wherein identifying one or more agenda items comprises receiving an agenda list.

3. The computer-implemented method of claim 1, wherein identifying one or more agenda items comprises performing an entity detection process on a presentation document associated with the meeting.

4. The computer-implemented method of claim 1, wherein identifying one or more agenda items comprises performing an entity detection process on a verbal meeting introduction.

5. The computer-implemented method of claim 1, further comprising providing an alert indication to the meeting moderator in response to the deviation exceeding a predetermined threshold.

6. The computer-implemented method of claim 5, wherein providing an alert indication comprises providing a visual alert indication.

7. The computer-implemented method of claim 5, wherein providing an alert indication comprises providing an audible alert indication.

8. The computer-implemented method of claim 5, wherein providing an alert indication comprises providing a tactile alert indication.

9. The computer-implemented method of claim 5, further comprising:
    identifying a deviation-inducing participant; and
    providing the alert indication to the deviation-inducing participant.

10. The computer-implemented method of claim 1, further comprising:
    acquiring video images of the two or more participants during the meeting;
    performing a facial expression analysis of each participant based on the acquired video images; and
    issuing a participant engagement alert to the meeting moderator in response to detecting a non-engagement sentiment.

11. The computer-implemented method of claim 10, further comprising issuing the participant engagement alert to participants determined to be exhibiting a non-engagement sentiment.

12. An electronic computation device comprising:
    at least one processor;

a memory coupled to the processor, the memory containing instructions, that when executed by the processor, perform the steps of:

identifying, by at least one processor, one or more agenda items for a meeting;

monitoring participant dialog continuously in real time during the meeting using natural language processing;

identifying a dialog topic based on the participant dialog;

computing a deviation between the dialog topic and one or more meeting agenda items, wherein the computing the deviation comprises:

identifying, by the at least one processor, a plurality of sentence pairs within the participant dialog;

classifying, by the at least one processor, each sentence pair of the plurality of sentence pairs as deviatory or non-deviatory;

counting, by the at least one processor, a number of deviatory sentence pairs for a predetermined time interval; and computing, by the at least one processor, a deviation score as a function of the number of deviatory sentence pairs counted within the predetermined time interval;

determining, by the computer, that the number of the deviatory sentence pairs exceeds a predetermined threshold, based on the deviation score;

responsive to the determining, generating, by the computer, a notification of the deviation, the notification including a continuous updating of a level of deviation displayed in real time during the meeting on a visual dashboard based on the deviation score; and providing, by the computer, the notification to a mobile device of the meeting moderator.

13. The electronic computation device of claim 12, wherein the memory further comprises instructions, that when executed by the processor, perform the step of performing an entity detection process on a presentation document associated with the meeting.

14. The electronic computation device of claim 12, wherein the memory further comprises instructions, that when executed by the processor, perform the step of providing an alert indication to the meeting moderator in response to the deviation exceeding a predetermined threshold.

15. A computer program product for an electronic computation device comprising a computer readable storage medium having program instructions embodied therewith, the program instructions executable by a processor to cause the electronic computation device to perform the steps of:

identifying one or more agenda items for a meeting;

monitoring participant dialog continuously in real time during the meeting using natural language processing;

identifying a dialog topic based on the participant dialog;

computing a deviation between the dialog topic and one or more meeting agenda items, wherein the computing the deviation comprises:

identifying a plurality of sentence pairs within the participant dialog;

classifying each sentence pair of the plurality of sentence pairs as deviatory or non-deviatory;

counting a number of deviatory sentence pairs for a predetermined time interval; and computing a deviation score as a function of the number of deviatory sentence pairs counted within the predetermined time interval;

determining, by the computer, that the number of the deviatory sentence pairs exceeds a predetermined threshold, based on the deviation score;

responsive to the determining, generating a notification of the deviation, the notification including a continuous updating of a level of deviation displayed in real time during the meeting on a visual dashboard based on the deviation score; and providing the notification to a mobile device of the meeting moderator.

16. The computer program product of claim 15, wherein the computer readable storage medium includes program instructions executable by the processor to cause the electronic computation device to perform the step of performing an entity detection process on a presentation document associated with the meeting.

17. The computer program product of claim 15, wherein the computer readable storage medium includes program instructions executable by the processor to cause the electronic computation device to perform the step of providing an alert indication to the meeting moderator in response to the deviation exceeding a predetermined threshold.

\* \* \* \* \*